United States Patent [19]

Anderson

[11] Patent Number: 5,048,197
[45] Date of Patent: Sep. 17, 1991

[54] APPARATUS AND METHOD FOR MEASURING PITCH DIAMETER

[76] Inventor: Gunnar Anderson, 12750 Caravel, Cerritos, Calif. 90701

[21] Appl. No.: 311,773

[22] Filed: Feb. 17, 1989

[51] Int. Cl.⁵ .............................. G01B 3/40; G01B 344
[52] U.S. Cl. .................................. 33/829; 33/199 R; 33/812
[58] Field of Search .................... 33/829, 792, 199 R, 33/199 B, 821, 501.05, 501.06, 501.08, 810, 811, 812, 794, 795

[56] References Cited

U.S. PATENT DOCUMENTS

| 734,784 | 7/1903 | Wells | 33/829 |
|---|---|---|---|
| 1,423,339 | 7/1922 | Ledell | 33/199 R |
| 2,210,561 | 8/1940 | Allen et al. | 33/199 R |
| 2,447,612 | 8/1948 | Dowe | 33/501.06 |
| 2,784,494 | 3/1957 | Aldeborgh et al. | 33/199 R |
| 2,874,475 | 2/1956 | McGaffey | 33/98 |
| 2,939,220 | 6/1960 | Croshier et al. | 33/199 R |
| 2,941,304 | 6/1960 | Man | 33/199 |
| 3,060,586 | 10/1962 | Yamamoto | 33/810 |
| 3,090,126 | 5/1963 | Kernoski | 33/199 |
| 3,314,155 | 4/1965 | Lavallee | 33/199 R |
| 3,353,277 | 11/1967 | Johnson | 33/792 |
| 3,432,935 | 3/1969 | Reish | 33/199 |
| 3,975,828 | 8/1976 | Calcaterra et al. | 33/821 |
| 4,189,843 | 2/1980 | Baldwin | 33/199 |
| 4,202,109 | 5/1980 | Schasteen | 33/199 |
| 4,202,109 | 5/1980 | Schasteen | 33/199 R |
| 4,238,885 | 12/1980 | Lendi et al. | 33/143 |
| 4,536,964 | 8/1985 | Lazes | 33/199 |
| 4,553,337 | 11/1985 | Brewster | 33/199 |
| 4,608,759 | 9/1986 | Bowhay | 33/143 |

FOREIGN PATENT DOCUMENTS

| 0382544 | 2/1908 | France | 33/829 |
|---|---|---|---|
| 0196282 | 1/1924 | United Kingdom | 33/810 |

Primary Examiner—Allan N. Shoap
Assistant Examiner—C. W. Fulton
Attorney, Agent, or Firm—Fulwider, Patton, Lee & Utecht

[57] ABSTRACT

An apparatus and method empolying a notched precision caliper in conjunction with a transfer tool such as a conventional dial gauge caliper having ball-point type contact surfaces to provide a direct quantitative indication of a threaded member's pitch diameter deviation from the nominal pitch diameter value by a deflection of the dial gauge.

7 Claims, 2 Drawing Sheets

APPARATUS AND METHOD FOR MEASURING PITCH DIAMETER

BACKGROUND OF THE INVENTION

The present invention relates generally to the art of measuring critical dimensions of a threaded member, and more particularly pertains to an apparatus and method for quickly, easily and precisely determining a threaded member's pitch diameter.

FIELD OF THE INVENTION

A number of parameters relating to thread dimensions and tolerances are of critical importance in the ultimate strength and performance of a threaded interconnection. A field wherein adherence to tight tolerances is especially crucial is in oil drilling operations. The interconnected piping which makes up a well casing is subjected to high pressures, high torque loads, high temperatures, vibration and general abuse and failure of any one threaded interconnection can result in leakage, or worse, a severance of the string inside a hole. While a leakage is always to be avoided, retrieval of a lost string is an extremely time consuming and expensive undertaking. In order to diminish the potential for failure of a pipe's threaded interconnections, very tight quality control is called for both at the mill where the pipe is produced and again in the field prior to its deployment.

As was mentioned above, a number of different dimensions, pertaining to threading are of critical importance. Typically, an industry will set forth standardized nominal values, which would include among others, thread lead, thread height, thread angle, thread taper and pitch diameter. A particular operation will then decide how much deviation from these nominal values is tolerable and conduct its quality control program accordingly.

A threaded member's pitch diameter is defined as the diameter of its pitch cone as measured at a perpendicular to the thread axis at a predefined point thereon. The three-dimensional pitch cone results when the pitch lines are rotated about the thread axis. A pitch line is coplanar with the thread axis and transects each thread at one-half its thread height. Such definitions are applicable to both externally as well as internally threaded members.

In the assembly of a piping string, the extent to which an internally threaded coupling is to be threaded onto an externally threaded pipe is gauged by the approach of the leading edge of the coupling towards a mark stamped onto the pipe and/or the reading of a gauge monitoring the applied torque.

Relying on either or both of these means does not, however, necessarily insure detection of an improper fit. For instance in the case of an undersized externally threaded pipe and/or an oversized internally threaded coupling, merely bringing the coupling into alignment with the mark without monitoring the applied torque can lead to an undertightening of the joint. Alternatively monitoring only the torque without attention to the mark can give an improper indication of a proper fit should the coupling begin to cut into the unthreaded portion of the pipe. Severely mismatched pitch diameters can lead to cross threading which would show both high torque readings and an eventual alignment with the mark despite an inferior interconnection. Either scenario can lead to leakage or complete failure of the joint. Conversely, in the case of an oversized externally threaded member and/or an undersized internally threaded member, the two components would be overtorqued by the time the coupling reaches its mark, possibly resulting in the cracking of one or the other component and inevitable failure of the interconnection. On the other hand, only monitoring the applied torque in such a situation, would allow only an insufficient amount of threading to engage. Pitch diameter is therefore an extremely important parameter that should be checked prior to the pipe's installation in order to avoid the potential for the failures described above.

A number of methods have been devised for measuring the pitch diameter of threading. Two wire and three wire techniques can be employed each requiring the placement of wires which form spacer cylinders within the threading on opposite sides of the threaded member after which a micrometer is used to measure their separation across their top surfaces. A number of such measurements may be required after which substantial manipulation of the data, including complex calculations and reference to various tabulated relationships, is required to yield a value for the pitch diameter. Considerable skill is required to obtain reasonably accurate, precise and hence repeatable results. These methods are very susceptible to error due to a variety of influences, in particular, imprecision in the wires' diameter or roundness has an exaggerated effect on the end result.

An alternative approach often used in field inspections employs an extremely precisely machined ring gauge. Such a gauge, machined to within 0.0001 in., is threaded onto the particular threaded member to be inspected and then checked for maximum axial end play. However, because of the interaction with the pipe threads, the ring gauge is subject to wear and therefore subject to frequent expensive replacement. In addition, the accuracy of such a determination can easily be compromised by the presence of contamination, out-of-roundness of the pipe or a single flaw within the threads. Most unfortunate is that error induced by such factors would give an indication that the threading is within tolerance limits when in fact it may not be.

Due to these inherent shortcomings of the pitch diameter determining methods, most field inspections required by the oil drilling industry are therefore typically limited to an inspection of thread taper, lead, and height. These techniques call for the use of dial gauge calipers having ball-point type contact surfaces. The ball-point type contact surfaces are available in different sizes, are arranged for either internal or external measurements and contact the threads in a fashion similar to the manner in which the wires or cylinders contact the threading in the two wire and three wire technique. The balls are interchangeable, are threaded into the receiving studs disposed on the gauge arms, and, despite being manufactured of tungsten or tantalum carbide, are subject to wear. Imprecision introduced by these factors precludes these tools from being used to directly provide an absolute pitch diameter measurement. Consequently, although the technique to measure thread taper does indirectly consider pitch diameter, only relative values are ever considered.

An apparatus or method has not been developed for quickly, easily and precisely determining pitch diameter, especially one well adapted for use in field inspections.

SUMMARY OF THE INVENTION

The general purpose of this invention is to provide an apparatus and a method by which a threaded member's pitch diameter can be quickly and easily determined with a high degree of precision and accuracy. To attain this, the present invention provides for a precision gauge, such as a vernier caliper, having specially notched reference surfaces to be used in conjunction with a transfer tool such as a conventional dial gauge caliper having ball-point type contact surfaces, whereby the deviation of a threaded member's pitch diameter from a nominal value is ultimately read directly off the dial gauge. No complex calculations are required, no tedious tables need be consulted and no errors are introduced by a worn ball surface, as the precise size of the ball is unimportant. The reference surfaces of a precision caliper are each notched in a configuration precisely corresponding in profile to the lower half of a single thread found in the particular threading of the threaded member to be measured. Upon setting the separation between the reference surfaces of the vernier caliper to the nominal pitch diameter value, the adjustable jaws of the dial gauge caliper are positioned there between such that its ball-point type contact surfaces engage the notches and the dial gauge reads zero. The dial gauge caliper is then used to gauge the actual pitch diameter of the threaded member and any deflection of the dial gauge from zero is a direct quantitative indication of the deviation of the threaded member's pitch diameter from the nominal. Because a worn or mismatched ball engages the reference surface's thread profile notch in exactly the same manner and to the same depth it engages the threaded member's threads, any errors that would otherwise be introduced are thereby effectively cancelled out.

Each of the precision caliper's reference surfaces on both sides of its jaws are notched so as to facilitate internal as well as external thread measurements. A plurality of thread profile notch pairs corresponding to different types of thread forms and thread leads, can be positioned along the reference surfaces such that different types of threading can be measured with the same instrument. In addition, one thread profile notch of each pair of corresponding thread profile notches is slightly laterally offset from the other along its reference surface to compensate for the effect introduced by the helix angle of the threading.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein:

FIG. 5 is a side view of a dial gauge caliper, included in the pitch diameter measuring apparatus shown in FIG. 1, being utilized to gauge the pitch diameter of the threaded oil well pipe shown in FIG. 2.

DETAILED DESCRIPTION OF THE PREFERRED EMBODIMENTS

Figure 1:
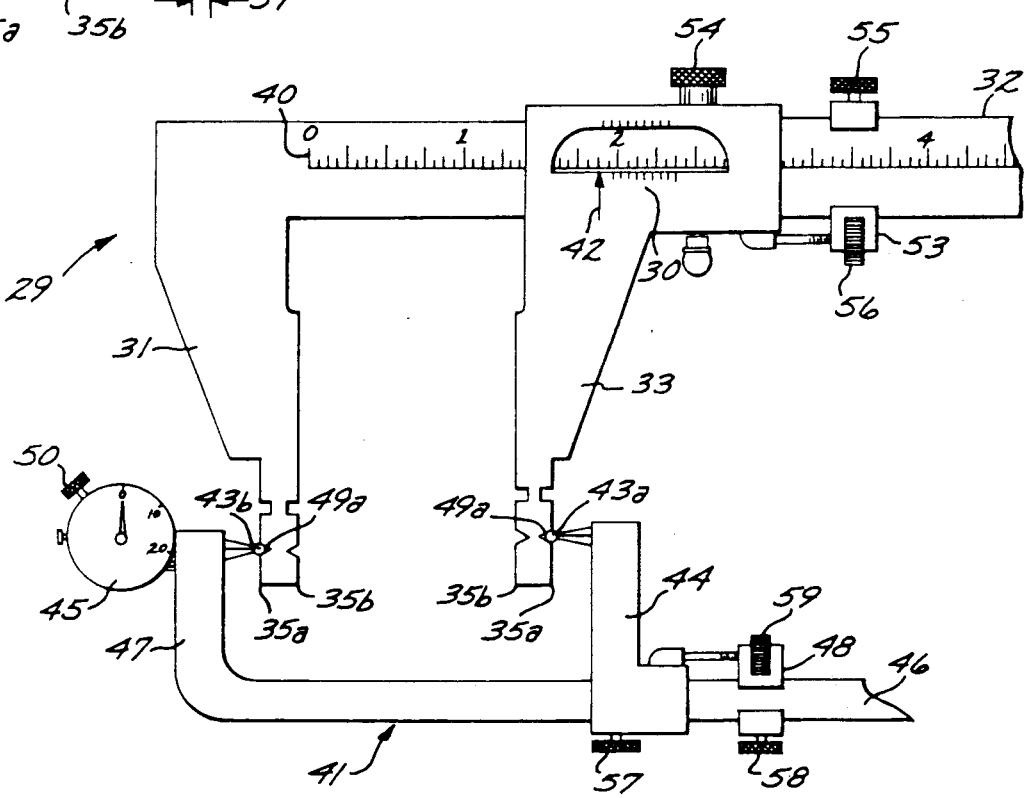
FIG. 1 is a front view of a pitch diameter measuring apparatus embodying the present invention.
Figure 6:
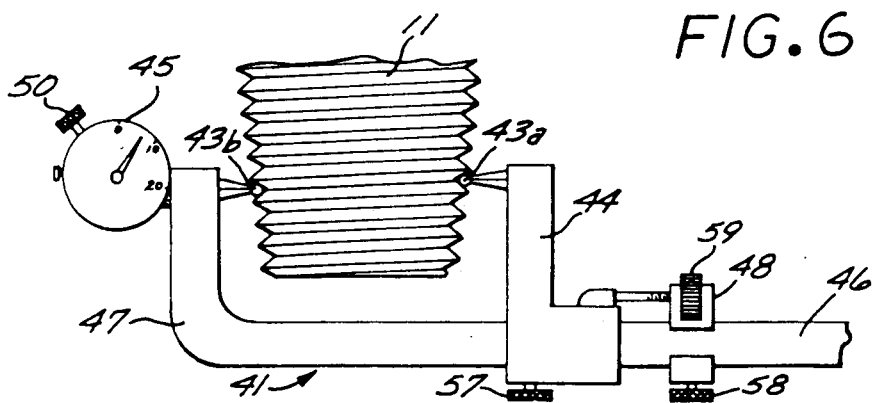
Figure 2:
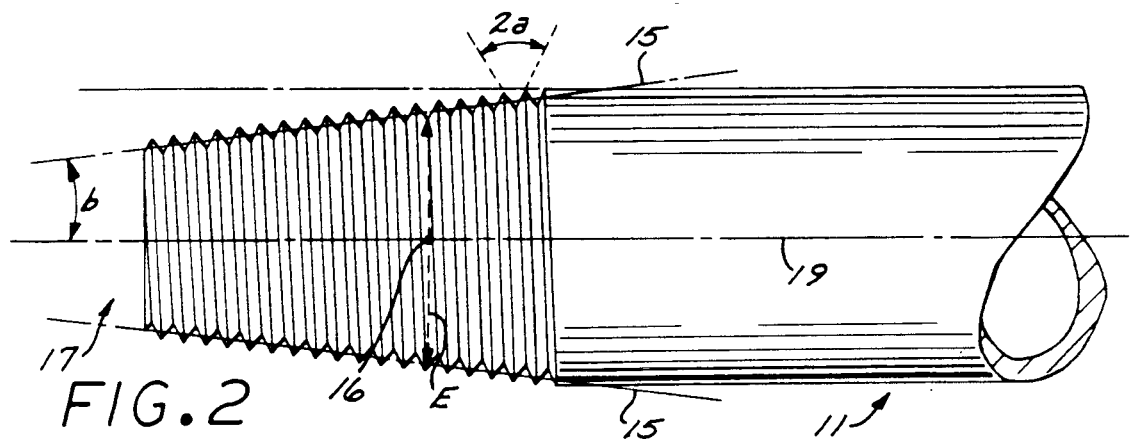
FIG. 2 is a side view of an externally threaded oil well pipe which may be measured by the pitch diameter measuring apparatus of the present invention.
Figure 3:
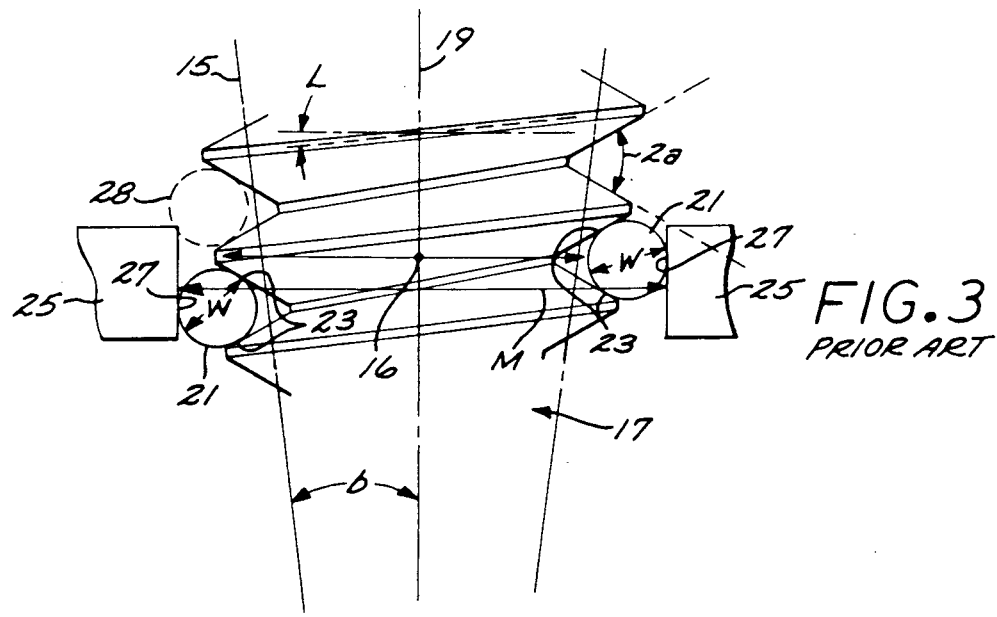
FIG. 3 is a side view in enlarged scale of a prior art pitch diameter measuring technique being applied.

FIG. 1 generally illustrates the pitch diameter measuring apparatus of the present invention. Utilization of this apparatus enables a measurement of the pitch diameter of a threaded member such as the drill pipe illustrated in FIG. 2, to be taken quickly, easily, and precisely. FIGS. 2 and 3 generally illustrate the dimensional relationships relevant to a threaded member's pitch diameter.

Referring now to FIG. 2, the pitch diameter E of a threaded member 11 is defined as the diameter of the pitch cone 17 as measured perpendicularly across the thread axis 19 at a particular point 16 thereon. The pitch cone 17, by definition, transects each thread at its half depth as illustrated in both FIG. 1 and FIG. 2. In the special case of non-tapered threading, all pitch lines 15 are parallel and consequently the pitch cone 17 is in actuality a cylinder.

As alluded to above, two rather cumbersome methods have heretofore been employed to measure the pitch diameter E of a threaded member. The following brief description of these procedures will serve to demonstrate the complexities associated with the measurement of such a parameter and emphasize the prior art's shortcomings. The two wire method (see FIG. 3) entails the placement of two wires or cylinders 21 of precisely known diameter W within the threads on opposite sides of the pitch cone 17. In the case of line pipe thread or round thread type thread forms, the diameter of the wires or cylinders must be selected such that the wires or cylinders contact the flanks of the thread at about midslope 23. A micrometer 25 is used to measure the distance M between the outside surfaces 27 of the wires. Pitch diameter E is then calculated using the following equation:

$$E = M + \cot a - \tan^2 b \tan a - \frac{w \left(1 + \csc a + \tan^2 L \cos a \cot a \right)}{2n} $$

in which:
 E = pitch diameter
 M = measurement over wires
 b = half angle of taper of thread
 n = number of threads per inch = 1/p
 a = half angle of thread
 w = mean diameter of wires
 L = helix angle A second measurement is obtained after relocating one of the wires to the adjacent thread (to the position 28 indicated in phantom in FIG. 3) on the other side of the perpendicular E to the thread axis 19 and the two resulting measurements are then averaged to yield a final pitch diameter value E. Care must be taken to insure that the contact surfaces of the micrometer 25 are held parallel to the thread axis 19 so as not to introduce error due to the effect of the thread's helix angle L. A method employing three wires or cylinders obviates the need for the second measurement but requires a similarly complex calculation to be performed. In addition to the fact that the thread angle, taper angle, thread lead and helix angle are subject to deviation from the nominal, the actual wire diameter and its degree of roundness has a profound effect on the final determined value. For instance, in order to measure 60° angle thread to an accuracy within 0.001 in., the diameter of the wire must be known to within 0.0002 in. Such measurements are typically time consuming, are sensitive to the above indicated variations and typically, a considerable amount of experience is required to obtain repeatable results.

The apparatus of the present invention enables this same measurement to be performed in a much simpler and quicker fashion to yield more accurate and precise results than are provided by the above described methods. Generally, the apparatus consists of a precision gauge and a transfer tool. In the preferred embodiment illustrated in FIG. 1, the precision gauge takes the form of a vernier caliper 29 wherein a rigid frame 32 locates a laterally projecting stationary jaw 31 and additionally slideably supports a laterally projecting movable jaw 33. A particular position of the movable jaw 33 along rigid frame 32 is secured by tightening set screw 54. Conversely, if set screw 55 is tightened while set screw 54 is released, fine adjustment of the movable jaw can be accomplished by rotation of thumbwheel 56, of fine adjustment mechanism 53. Each jaw 31, 33 has at least one and preferably two reference surfaces 35a, 35b, thereon. One pair of internally opposed reference surfaces 35b in addition to one pair of externally opposed surfaces 35a provides for an especially versatile device as will become apparent hereinafter. The precise separation of the jaws is ascertainable by reading the primary scale 40 where indicated by index mark 42. The primary scale 40 is marked directly on the rigid frame 32, while index mark 42 is located on a portion of moveable jaw 33. Very precise determinations of jaw separation are ascertainable with the aid of the vernier scale 30 which is additionally marked directly on moveable jaw 33.

The instrument may in fact be calibrated in two different scales, one to indicate the separation of the jaws' internally opposed reference surfaces 35b and a second indicating the separation of the externally opposed reference surfaces 35a of the jaws. Alternatively, if the total width of the jaws is precisely known, a single scale may be employed in which case a simple addition of the width of the jaws to the separation of the internally opposed reference surfaces 35b yields the separation of the externally opposed reference surfaces 35a.

Figure 4:
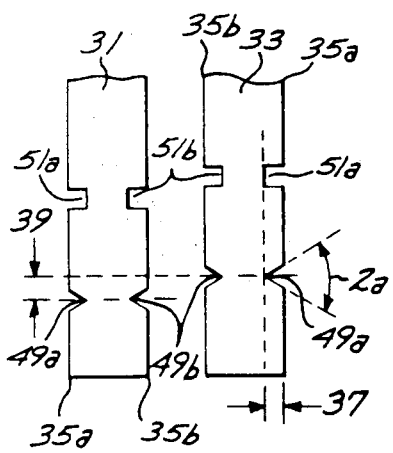
FIG. 4 is an enlarged detail view of the reference surfaces of the pitch diameter measuring apparatus illustrated in FIG. 1.

Both the internally opposed as well as the externally opposed reference surfaces 35a, 35b are notched as illustrated in an enlarged form in FIG. 4 to form respective interior and exterior V-shaped notches 49a and 49b interior and exterior square notches 51a and 51b. The notches precisely correspond in profile to the lower half of the thread configuration found on particular threaded members, i.e., each thread profile notch conforms to the profile of that threading from its innermost point to the pitch line 15. The thread profile notches found on the internally opposed reference surfaces 35b are used in the measurement of the pitch diameter of an internally threaded member while the notches on the externally opposed reference surfaces 35a are used in the measurement of the pitch diameter of an externally threaded member.

Both thread form as well as thread lead of the particular threads to be measured dictates the precise profile of the pair of notches appropriate for that measurement. For example, thread profile notches 51a and 51b are employed to measure a buttress type thread form while thread profile notches 49a and 49b are employed to measure to 60° line pipe thread. While the 60° angle (2a) is maintained regardless of thread lead, the depth of the 60° thread is a function of the thread lead. Fewer threads per inch result in deeper thread depths in order for the 60° angle to be maintained throughout. Consequently, different thread profile notch pairs are required for measuring two different threaded members having the same thread form but of different thread lead.

In addition, one thread profile notch of each pair of thread profile notches is laterally offset along its respective reference plane to a degree 39 corresponding to the thread lead. This offset 39 compensates for the effect on the pitch diameter measurement introduced by the helix angle L of the particular threading. As measurements are actually taken at a slight diagonal across the threaded member, i.e., along a particular thread, the measured distance is slightly greater than the true pitch diameter E and offset 39 is employed to automatically compensate for the discrepancy. The offset 39 corresponds to half the distance between two adjacent threads. The greater the thread lead, the fewer threads per inch, the greater the helix angle L and the greater is the offset 39 required to compensate therefore. Such is the case for all types of threading including the 60° angle pipe thread as well as buttress thread.

In the oil drilling industry the most commonly encountered threads are 60° line pipe thread or 60° round thread, each with a thread lead of eight threads per inch. In addition, five thread per inch buttress type threading is also often encountered. The difference between line pipe thread and round thread lies in the curvature of the vertex of the "V", the round pipe type thread form having a slightly rounded profile. As measurements are taken along the flanks 23 of the "V", the precise configuration of the vertex is unimportant and a single type of notch as illustrated in FIG. 4 can be used in the measurement of either round thread or line pipe thread. Consequently, the total of eight notches illustrated in FIG. 4 are sufficient to cover the vast majority of threaded members encountered in the oil drilling industry. Notches 49a are used for measuring all externally threaded line pipe or round thread piping with the eight threads per inch thread lead. Notches 49b are used for the measurement of all internally threaded collars having either line pipe thread or round thread with the similar eight threads per inch thread lead, while notches 51a and 51b are used for the internal and external buttress type threading of a five thread per inch thread lead.

The second component of the pitch diameter measuring apparatus of the present invention consists of a transfer tool. In the preferred embodiment illustrated in FIG. 1 the transfer tool takes the form of a dial gauge caliper 41 having ball-point type contact surfaces 43a, 43b. The transfer tool shares some similarities with the precision gauge 29 in that it similarly employs a rigid frame 46 that is shaped into or has laterally projecting therefrom, a stationary jaw 47. Moveable jaw 44 is slideably affixed to rigid frame 46 and laterally projects therefrom. Set screw 57 serves to rigidly locate moveable jaw 44 in any desired position along rigid frame 46. The fine adjustment mechanism 48 enables fine adjustment of the moveable jaw's 44 position when set screw 58 is set, set screw 57 is released and thumbwheel 49 is rotated. The transfer tool's jaws 44, 47 have ball-point type contact surfaces 43a, 43b affixed thereto. While contact surface 43a is rigidly affixed to jaw 44, contact surface 43b is slideably mounted within jaw 47 to allow a slight amount of movement directly towards and directly away from contact surface 43a. A push rod (not shown) interconnects the contact surface 43b with a dial gauge 45 to provide a very precise indication of a change in contact surface's 43b position relative to a predefined '0' point. Although this transfer tool is incapable of providing an absolute measurement of the contact surfaces' 43a, 43b separation, it is capable of providing a very precise measure of slight changes in separation.

FIGS. 1 and 5 serve to illustrate the method by which the apparatus of the present invention is used to measure a threaded member's pitch diameter. The precision gauge/vernier caliper 29 is used in conjunction with the transfer tool/dial gauge caliper 41 having ball-point type contact surfaces 43. Upon determining the nominal pitch diameter a particular threaded member should have, the moveable jaw 33 of the vernier caliper 29 is opened to separate the reference surfaces by a distance precisely corresponding to the nominal pitch diameter value. The moveable jaw 33 first moved to position roughly corresponding to the nominal value, set screw 55 is tightened, thumbwheel 56 is rotated until the jaw's setting precisely corresponds (by benefit of the vernier scale reading) to the nominal value afterwhich set screw 54 is tightened to firmly lock the moveable jaw 33 in place. The conventional dial gauge caliper 41 is then adjusted by movement of its adjustable arm 44 such that the ball point type contact surfaces 43 approximately contact the appropriate notches (49a, 49b, 51a, or 51b) on the precision caliper 29. Set screw 58 is locked, and moveable jaw 44 is more precisely moved into position by rotating thumbwheel 59, afterwhich set screw 57 is tightened to lock moveable jaw 44 in place. Alternatively, the dial gauge can be "zeroed" by rotation of its own adjustment knob. It is desirable that the adjustments be such that the dial gauge 45 indicates precisely "0". As readily apparent hereinafter this ultimately facilitates a direct reading of pitch diameter deviation off the dial gauge. The adjusted and locked dial gauge caliper is then simply inserted into diametrically opposed points in the threads of the threaded member at a predefined location along the thread axis. A reading of "0" would indicate that the measured pitch diameter E corresponds exactly to the nominal pitch diameter. Any deflection, plus or minus, of the dial gauge directly provides a quantitative indication of the deviation from the nominal value.

Internal measurements call for the use of a transfer tool having a slightly different configuration from that illustrated in the figures so as to enable engagement of the interior portions of a threaded member. However, the method remains the same, i.e., the precision gauge is first adjusted to the nominal value, the transfer tool with the ball point type contact surfaces is subsequently adjusted between the appropriate thread profile notches on the internally opposed reference surfaces of the jaws of the precision gauge and then inserted into the threaded member. A deflection of the dial gauge is a direct indication of the deviation from the nominal as described above.

In operation it should be apparent that this method is not susceptible to the errors caused by worn ball point type contact surfaces or the extent to which the ball point type contact surfaces had been actually threaded or misthreaded into the receiving means on the calipers. As long as the diameter of the ball is such that contact is made within the thread profile notch on the caliper's reference surface, the ball point contact surface will fit into the threaded member's threads in precisely the same manner and hence, any errors otherwise introduced by such factors are effectively cancelled out.

Many modifications and variations of the present invention are possible in light of the above teachings, and it is therefore to be understood that within the scope of the appended claims the invention may be practiced otherwise than as specifically described.

What is claimed is:

1. A system for measuring pitch diameter of a selected threaded member having threading with one of a plurality of thread forms, and a predetermined thread depth and thread lead, comprising:

a precision gauge having (1) a pair of variably separable jaws each with a reference surface thereon, (2) a means of indicating the precise absolute separation of the separable jaws' reference surface, and (3) a single thread profile notch for at least one of said plurality of thread forms formed in each reference surface, each said profile notch corresponding in shape to said selected threaded member's thread form and to one half its predetermined thread depth, said thread profile notch formed in one of said pair of jaws being laterally offset with respect to said thread profile notch formed in the other of said jaws a predetermined dimension, said predetermined dimension corresponding to one half a thread lead dimension of said selected threaded member; and a transfer tool having a pair of variably separable jaws, each with a ball-point type contact surface affixed thereto, said ball-point type contact surfaces being conformed for receipt within (1) said thread profile notches of said precision gauge, and (2) said threaded member's threading, said variably separable jaws of said transfer tool being configured such that said ball-point type contact surfaces engage said threaded member's threading at substantially diametrically opposed locations, and a means for locking a particular separation of said transfer tool's jaws in place.

2. The apparatus of claim 1, wherein:
one of said ball-point type contact surfaces is slideably affixed to one of said variably separable jaws of said transfer tool so that the separation of the ball-point type contact surfaces can be slightly varied and further comprising a means for indicating the precise amount the separation of the ball-point type contact surfaces is so varied.

3. The apparatus of claim 2, wherein:
said means for indicating a variation in separation of said ball-point type contact surfaces comprises a dial gauge.

4. The apparatus of claim 3, wherein:
said dial gauge is capable of indicating an increase or a decrease in separation of said ball-point type contact surfaces.

5. The apparatus of claim 1, wherein:

said means for indicating the precise separation of said precision gauge's reference surfaces comprises a vernier scale.

6. A method for determining a selected threaded member's pitch diameter deviation from a nominal value wherein said threaded member has threading having one of a plurality of thread profiles, and a predetermined thread depth and thread lead, comprising the steps of:

selecting a precision gauge of the type including a pair of variably separable jaws, each jaw having a reference surface thereon and each reference surface having a single thread profile notch for at least one of said plurality of thread profiles corresponding in shape to said selected threaded member's thread form and one half its predetermined thread depth;

selecting a transfer tool of the type including a pair of variably separable jaws, one jaw having a ball-point type contact surface rigidly affixed thereto and a second jaw having a ball-point type contact surface slidably affixed thereto to allow separation between the contact surfaces to be slightly varied, said transfer tool additionally including a means for indicating the precise degree of said variation, said ball-point type contact surfaces being conformed for receipt within said thread profile notches of said precision gauge and said variably separable jaws of said transfer tool being configured such that said ball-point type contact surfaces are capable of engaging said threaded member's threading at diametrically opposed locations;

setting the jaws of said precision gauge so that said reference surface's separation precisely corresponds to said threaded member's nominal pitch diameter;

adjusting the separation of said transfer tool's contact surfaces, so that each ball-point type contact surfaces engages a jaw of said precision gauge within said thread profile notch;

noting a first reading of said indication means of said transfer tool;

engaging with said adjusted transfer tool said threaded member's threading at diametrically opposed locations;

noting a second reading of said indication means of said transfer tool; and comparing the first and second reading to determine the deviation of such preselected threaded member's pitch diameter from a nominal value.

7. The method of claim 6 wherein the step of selecting said precision gauge includes the step of selecting a gauge of the type having an indication means comprising a dial gauge configured such that the separation of the contact surfaces of the transfer tool's jaws may be adjusted between the jaws of the precision gauge such that the dial gauge reads "zero" whereby the second reading, as the contact surfaces engage the threaded member's threading, provides a direct indication of the threaded member's pitch diameter deviation from a nominal value.

* * * * *